United States Patent [19]

O'Hara et al.

[11] Patent Number: 5,293,877
[45] Date of Patent: Mar. 15, 1994

[54] BODY TEMPERATURE THERMOMETER AND METHOD FO MEASURING HUMAN BODY TEMPERATURE UTILIZING CALIBRATION MAPPING

[75] Inventors: Gary J. O'Hara, Escondido; John J. Korff, Oceanside; Peter A. Crill, Leucadia, all of Calif.

[73] Assignee: Sherwood IMS, Inc., Carlsbad, Calif.

[21] Appl. No.: 842,129
[22] PCT Filed: Dec. 11, 1991
[86] PCT No.: PCT/US91/09404
§ 371 Date: Mar. 11, 1992
§ 102(e) Date: Mar. 11, 1992
[51] Int. Cl.$^5$ ............................................. A61B 5/00
[52] U.S. Cl. ...................................... 128/736; 374/133
[58] Field of Search ............... 128/664, 736; 374/128, 374/129, 132, 133

[56] References Cited

U.S. PATENT DOCUMENTS

| | | | |
|---|---|---|---|
| 4,602,642 | 7/1986 | O'Hara et al. | 128/736 |
| 4,722,612 | 2/1988 | Junkert et al. | 374/133 |
| 4,784,149 | 11/1988 | Berman et al. | 128/664 |
| 4,797,840 | 1/1989 | Fraden | 364/557 |
| 4,895,164 | 1/1990 | Wood | 128/736 |
| 4,932,789 | 6/1990 | Egawa et al. | 374/126 |
| 5,012,813 | 5/1991 | Pompei et al. | 128/664 |
| 5,017,018 | 5/1981 | Iuchi et al. | 374/130 |

Primary Examiner—Max Hindenburg
Attorney, Agent, or Firm—Baker, Maxham, Jester & Meador

[57] ABSTRACT

A body temperature thermometer has a probe head assembly (8) which includes a first sensor (10), such as a thermopile, for generating a first output signal representative of an amount of infrared radiation impinging thereon The probe head assembly further includes a waveguide (16) and a surrounding hollow probe (14) for receiving infrared radiation emitted by a biological surface tissue, such as the external ear canal and tympanic membrane of a patient, and directing the radiation to the first sensor. A second sensor (12) is mounted in the probe head assembly for generating a second output signal representative of a temperature of the first sensor. A third sensor (26) is thermally coupled to the waveguide for providing a third output signal representative to the temperature thereof. A processor (30) is connected to the sensors for processing the output signals to determine a body temperature of the patient utilizing a calibration mapping of a plurality of target temperatures to corresponding output signals taken over a predetermined range of ambient temperatures. A display (34) is driven by the processor for providing a user with a visual indication of the determined body temperature.

26 Claims, 9 Drawing Sheets

FIG. 8

BODY TEMPERATURE THERMOMETER AND METHOD FO MEASURING HUMAN BODY TEMPERATURE UTILIZING CALIBRATION MAPPING

TECHNICAL FIELD

The present invention relates to medical instrumentation, and more particularly, to a system and method for measuring the core temperature of the human body by detecting and analyzing infrared emissions in the external ear canal of a patient.

BACKGROUND ART

The diagnosis and treatment of many diseases depends upon accurate reading of the internal or core temperature of a patient's body, and in some instances, upon a comparison to a previous body temperature reading. For many years, the most common way of taking a patient's temperature involved the utilization of a Mercury-filled thermometer. They must be sterilized, shaken down, inserted and maintained in the patient's mouth or rectum for several minutes, and then carefully inspected when removed to determine the extension of the column of Mercury. Because of these many drawbacks, electronic thermometers were developed and have been widely used over the last twenty years. The first widely successful electronic thermometers were of the oral predictive type. Examples of these thermometers are those sold under the trademarks IVAC and DIATEC. Typically they have a thermally conductive probe connected by wires to a remote unit containing an electronic circuit. The probe is sheathed in a protective, disposable cover before being inserted into the patient's mouth or rectum. Using predictive techniques, the patient's temperature reading is taken in a significantly shorter time period, for example, thirty seconds, compared to the several minutes required for conventional Mercury thermometers. Such electronic thermometers normally have meters or other displays which enable the operator to determine the temperature much more readily than reading the position of the terminal end of a column of Mercury in a glass tube. Also, electronic thermometers of the foregoing type may provide, in some instances, more accurate temperature readings than Mercury thermometers. Furthermore, the protective covers are disposable, thus allowing the same thermometer to be used over and over without autoclaving or other sterilization.

The tympanic membrane is generally considered by the medical community to be superior to oral, rectal or axillary sites for taking a patient's temperature. This is because the tympanic membrane is more representative of the body's internal or core temperature and more responsive to changes in the core temperature. U.S. Pat. No. 3,282,106 of Barnes long ago suggested the desirability of a tympanic thermometer which would measure human body temperature by sensing infrared emissions in the external ear canal. However, it was not until the system of U.S. Pat. No. 4,602,642 of Gary J. O'Hara et al. was commercialized under the federally registered trademark FirstTemp by Intelligent Medical Systems, Inc., of Carlsbad, Calif., that a clinically accurate tympanic thermometer was actually made available to the medical community.

The FirstTemp clinical thermometer comprises three units, i.e., a probe unit having an infrared sensor, a chopper unit having a target, and a charging unit. In addition, a heating control means for preheating the infrared sensor and the target to a reference temperature (36.5 degrees C.) close to that of the external ear canal is provided, and is driven by charged energy from the charging unit. The probe unit is normally seated in the chopper unit, wherein the infrared sensor and the target are preheated by the heating control means. In this state, calibration is performed. Thereafter, the probe unit is detached from the chopper unit and is inserted in the external ear canal to detect infrared radiation from a drum membrane. A body temperature measurement is performed by comparing the detected infrared radiation with that from the target.

Temperature measurement precision is achieved by the above-described FirstTemp thermometer for the reasons described below. Various error factors are eliminated by preheating the probe unit having the infrared sensor and the target to a reference temperature (36.5 degrees C.) close to a normal body temperature by using the heating control means. That is, by heating the probe to the reference temperature which is higher than a room temperature and keeping the infrared sensor at a constant temperature regardless of the ambient temperature, sensitivity variations of the infrared sensor are eliminated, and hence its error can be neglected. In addition, calibration is performed so as to set the reference temperature of the target to be close to a body temperature to be measured, and a comparative measurement is then performed so that errors and the like due to the optic system characteristics are reduced to a negligible level. Furthermore, since the probe is preheated to a temperature close to a body temperature, the draw-down problem of the conventional measurement system can be solved i.e., the problem that when a cool probe is inserted in the external ear canal, the temperatures of the external ear canal and the drum membrane are lowered because of the probe, so that correct body temperature measurement cannot be performed.

The above-described FirstTemp thermometer disclosed in U.S. Pat. No. 4,602,642 is excellent in temperature measurement precision. However, since this thermometer requires a heating control unit with high control precision, its structure and circuit arrangement become complicated, thereby increasing the cost. In addition, it requires a relatively long stable period to preheat the probe and the target and control their temperature to a predetermined temperature. Moreover, the heating control unit is driven by relatively large batteries and requires a re-charging unit connectable to an AC power source. Therefore, it is not practical to utilize the invention of U.S. Pat. No. 4,602,642 in a portable clinical thermometer using a small battery as an energy source.

Various attempts have been made to provide a portable tympanic thermometer which does not require a heated reference target.

U.S. Pat. No. 4,797,840 of Fraden which is assigned to THERMOSCAN, Inc. discloses a thermometer that utilizes a pyroelectric sensor and therefore requires a moveable shutter.

U.S. Pat. No. 4,784,149 of Berman et al. which is assigned to Optical Sensors, Inc. discloses an infrared tympanic thermometer which utilizes an unheated target whose temperature is sensed during calibration.

U.S. Pat. No. 4,993,424 of Suszynski et al. which is assigned to DIATEK, Inc. discloses a tympanic thermometer requiring a moveable calibration plate.

U.S. Pat. Nos. 4,993,419 and 5,012,813 of Pompei et al. which are assigned to Exergen Corporation disclose a tympanic thermometer which is sold under the trademark OTOTEMP. The thermopile is mounted inside a unitary heat sink that extends along the tubular waveguide in tapered fashion. The length and reflectance of the waveguide are controlled to limit the field of view of the thermopile. The electronic circuit supposedly contributes to improved accuracy by determining the target temperature as a function of the temperature of the hot junction of the thermopile determined from the cold junction temperature and a known thermopile coefficient. The determined internal temperature is adjusted based upon the ambient temperature to which the surface tissue is exposed.

U.S. Pat. No. 4,907,895 of Everest which is assigned to IVAC CORPORATION discloses a tympanic thermometer that utilizes a chopper wheel.

U.S. Pat. No. 5,017,018 of Iuchi et al. which is assigned to NIPPON STEEL CORPORATION discloses another tympanic thermometer. Various constructions of the tip are used to prevent errors due to the temperature change therein, including a temperature sensor on the tip (FIG. 18).

U.S. Pat. No. 4,895,164 of Wood which is assigned to TELATEMP CORPORATION discloses a tympanic thermometer in which a thermopile and a thermistor which detects the temperature of the thermopile are held in closely spaced relationship by an isothermal block which extends a substantial distance around the wave guide.

U.S. Pat. No. 5,024,533 of Egawa et al. which is assigned to Citizen Watch Co., Ltd. discloses a thermometer that utilizes a thermopile $3a$ (FIG. 18) which is supported within a metal housing 19 for receiving infrared radiation from the external ear canal through a gold-plated tubular waveguide 20. The radiation passes through a probe cover of the general type sold by IMS and through a silicon filter $2b$. A first temperature-sensitive sensor $3b$ which may be a diode is mounted in the housing 19 adjacent the thermopile $3a$ for measuring the first temperature of the thermopile and an ambient temperature. A second temperature-sensor $3c$ is attached to the external surface of the waveguide 20 for measuring a second temperature of the waveguide. Utilizing the circuitry shown in the functional block diagram of FIG. 9, the third embodiment of the Citizen thermometer reads the digitally converted voltage of the first temperature-sensitive sensor $3b$ and converts the voltage into degrees $T_o$. The circuitry then reads the digitally converted voltage of the second temperature-sensitive sensor $3c$ and converts this voltage into degrees $T_p$. The circuitry also reads the following stored data:

1) The sensitivity of the thermopile at a known temperature;
2) The Coefficient of variation in responsivity as a function of temperature of the thermopile;
3) The gain of the thermopile amplifier;
4) The thermopile sensitivity based on the light-receiving area of the sensor (field-of-view);
5) The symmetrical axis temperature for correcting the filter transmission characteristics;
6) The transfer function relating the output of the ambient sensor to temperature, in degrees;
7) The transfer function relating the output of the optic waveguide sensor to temperature, in degrees;
8) The emissivity of the target (or assumed 1); and
9) The emissivity of the optic waveguide.

The circuitry of FIG. 19 of the '533 Citizen patent further reads the digitally converted voltage of the thermopile $3a$. It calculates the target temperature (also referred to as body temperature) as a function of the stored sensitivity and emissivity data. The circuitry then corrects the target temperature using stored filter correction data and finally corrects the target temperature as a function of the temperature difference between the ambient sensor and the waveguide sensor and the emissivity of the waveguide.

Unit-to-unit manufacturing and assembly variances encountered in thermopiles, thermistors and other components preclude the use of a rigid set of equations describing the physical interactions of electronic and optical components to calculate a body temperature with sufficient accuracy. The errors introduced by each component are cumulative and affect the other components. Each component must be individually calibrated in prior art tympanic thermometers. The relationships between all the inputs and the target temperature over a range of ambient temperatures are too complex to specify. Experiments have demonstrated that sufficient accuracy is not achievable by utilizing sensors to sense the temperature of the thermopile and waveguide and then processing the signals according to equations which subtract an amount from the measured temperature of the target which is attributable to temperature variations in the waveguide.

DISCLOSURE OF INVENTION

Broadly speaking, the present invention provides a highly accurate method and apparatus for measuring human body temperature based upon a novel calibration technique which does not depend upon a rigid set of equations describing the interactions of the components of the apparatus in terms of the physical laws of irradiance.

The apparatus comprises first sensor means for generating first output signal representative of an amount of infrared radiation impinging there from a biological surface tissue of a patient. The apparatus further comprises second processor means for generating a second output signal representative of a temperature of the first sensor. Processor means connected to the sensor means processes the output signals to determine a body temperature of the patient utilizing a calibration mapping of a plurality of target temperature to corresponding output signals. Means connected to the processing means provide an indication to a user of the determined body temperature.

The method comprises the steps of providing a probe head assembly having a first sensor for receiving infrared radiation emitted in the ear canal of a patent and generating a first output signal representative of the amount of infrared radiation impinging thereon, and a second sensor for generating a second output signal representative of the temperature of the first sensor. The method further comprises the step of successively pointing the probe head assembly at a plurality of targets each maintained at a corresponding reference temperature. The method further comprises the step of storing a calibration mapping of the magnitude of the first and second output signals for each of the targets. In a final step of the method, the probe head assembly is pointed at the external ear canal and the body temperature of the patient is determined utilizing the output signals from the sensors and the calibration mapping.

According to a further aspect of the present invention, a method of determining the body temperature of a patient is provided which comprises the steps of providing a probe head assembly having a probe tip insertable in an external ear canal of a patient and an infrared sensor. The output of the infrared sensor is sampled prior to insertion of the probe tip into the ear canal and a first set of values representative thereof is stored. According to the next step of the method, the probe tip is inserted into the external ear canal so that infrared emissions in the external ear canal can impinge on the infrared sensor. The output of the infrared sensor is once again sampled and a second set of values representative thereof is stored. Finally, the body temperature of the patient is determined based upon a peak value of the first and second set of values.

BEST MODE FOR CARRYING OUT THE INVENTION

Two approaches are possible in the design of the housing of a tympanic thermometer which contains the infrared sensor and associated optics The housing can be constructed of thermally conductive (i.e. metal) components in an attempt to isothermally maintain all elements of the system. If the filters, waveguide, and infrared sensor are all maintained at the same temperature, which is the so-called isothermal approach, the amount of error introduced due to variations in infrared emissions from any of the above components will be lessened. Unless electric heating is used, this is not readily achievable in a tympanic thermometer which makes contact with the ear which is at a different temperature than the sensor housing. Isothermal designs without active heating have relied upon all metal components or high thermal conductivity components in intimate thermal contact. However, temperature gradients still exist. An alternative approach utilized by our invention is to construct the housing using thermally insulative (i.e. plastic) components in order to slow down the changes in temperature of the filters, waveguide and infrared sensor. This is the so-called non-isothermal approach.

Figure 1A:
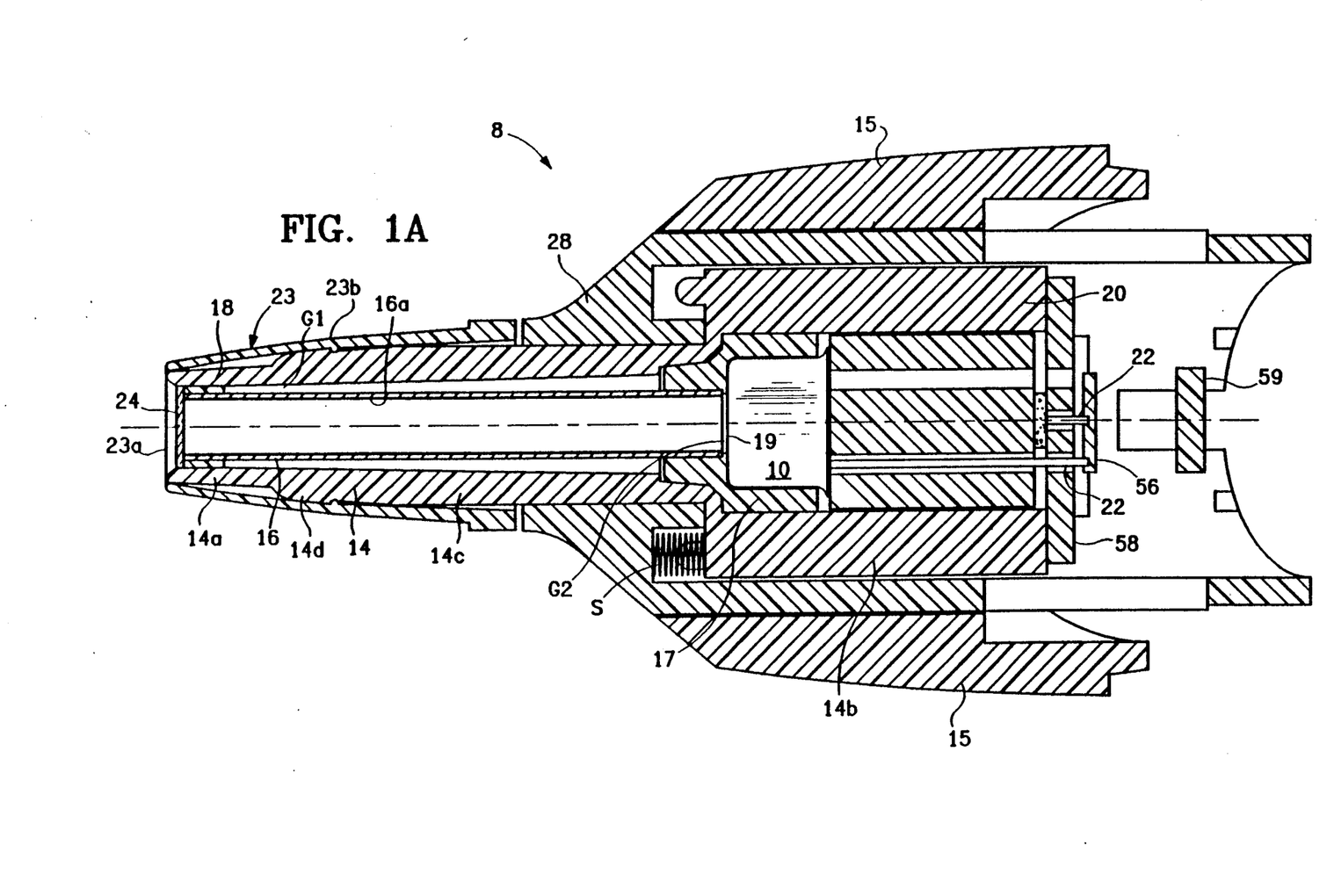
FIGS. 1A and 1B are enlarged, fragmentary, lateral and longitudinal cross-sectional views, respectively, of a portion of a probe head assembly that may be utilized in a preferred embodiment of the present invention. A thermopile detector mounted therein is shown in elevation.
Figure 1B:
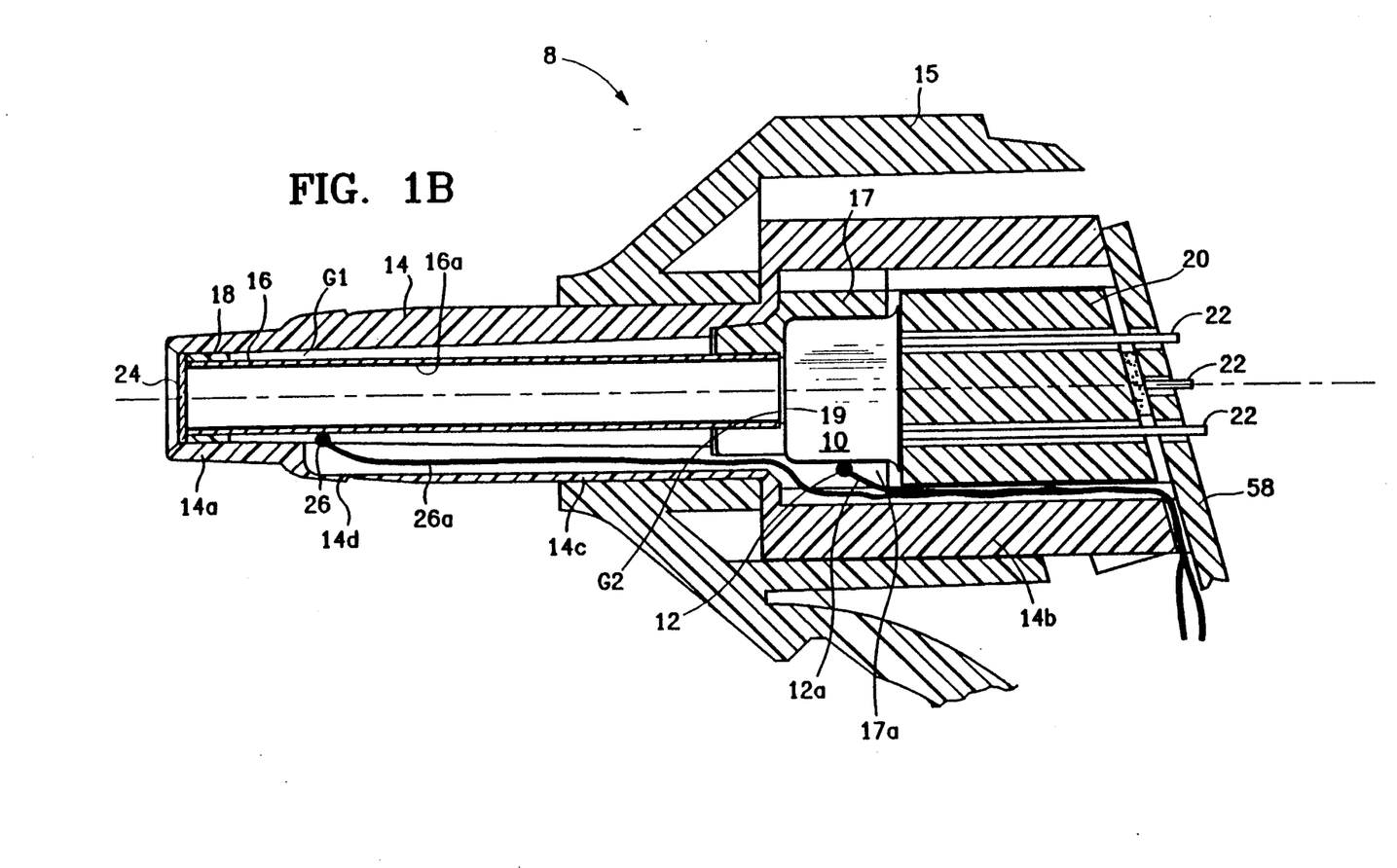

Referring to FIGS. 1A and 1B, the illustrated embodiment of the present invention has a probe head assembly 8 which includes a first sensor in the form of a thermopile 10. The first sensor is sometimes referred to herein as the infrared sensor. It emits a voltage corresponding to the temperature of the "hot junctions" relative to the "cold junctions". A suitable thermopile detector is commercially available from Dexter Research of Michigan. It includes a plurality of individual thermocouples connected in series. Each thermocouple has a cold junction and a hot junction See U.S. Pat. No. 4,722,612 of Junkert et al. granted Feb. 2, 1988. The thermopile 10 generates an analog output signal (voltage) representative of the amount of infrared radiation that impinges thereon. The illustrated embodiment of the present invention is designed to sense infrared radiation emitted by a biological surface tissue, and in particular, by the skin of the external ear canal and by the tympanic membrane of a human body.

A second sensor 12 (FIG. 1B) is secured to the thermopile can via thermally conductive EPOXY. It generates an analog output signal (voltage) on lines 12a representative of the temperature of the thermopile detector 10. One sensor suitable for this purpose is a thermistor. The sensor 12 is sometimes referred to herein as the ambient sensor because it effectively measures the ambient temperature of the room in which the thermometer is being used, and thus the temperature of the thermopile 10. It is critical to know the temperature of the thermopile in determining the amount of infrared radiation impinging thereon from its output signals.

A fairly wide field-of-view of the first sensor is desirable so that the thermometer is not susceptible to changes in the orientation of the thermometer with respect to the ear. Stated another way, it is desirable to "integrate" the temperature of the ear canal and tympanic membrane rather than acquire the temperature of a small spot on the ear canal. A tubular waveguide accomplishes this when placed in proximity with the viewing aperture of the thermopile. It is preferable that the waveguide be Brass or Copper with the inside diameter plated with Gold to achieve the highest possible reflectivity in the infrared region of the spectrum, i.e. a wavelength of 8-12 microns.

Referring still to FIGS. 1A and 1B, an elongate, generally cylindrical hollow plastic probe 14 surrounds and supports a waveguide in the form of a Brass or Copper tube 16. The waveguide and probe provide a means for receiving infrared radiation and directing it to the thermopile 10. The interior wall of the metal tube 16 is plated with a layer of Gold 16a. The probe 14 has a tip 14a dimensioned and configured for insertion into a patient's external ear canal. The probe 14 includes a rear portion 14b which is connected to the rear end of an intermediate portion 14c. The rear portion 14b and the intermediate portion 14c are supported by a plastic case 15 (FIG. 1B). The case 15 has an ergonomically shaped rearward portion (not illustrated) which is grasped by a user and encloses the bulk of the electronic components that make up the circuit of FIG. 2. The case 15 may be injection molded ABS plastic The probe 14 is preferably injection molded ABS plastic which has a low heat transfer coefficient.

The rearward end of the metal waveguide 16 fits within a cylindrical stepped plastic mounting sleeve 17

(FIG. 1A) mounted inside the rear portion 14b of the probe. The forward end of the waveguide tube is surrounded and supported by a plastic collar 18. The outer diameter of the waveguide tube is smaller than the inner diameter of the intermediate portion 14c of the probe to provide an air gap G1 therebetween. This air gap minimizes conductive heat flow from the outer ear canal, through the probe 14 to the waveguide 16. Preferably the air gap G is approximately 0.080 inches in width. The rearward end of the waveguide tube is spaced 0.005 to 0.010 inches from the thermopile detector 10. This gap, labeled G2 in FIGS. 1A and 1B, prevents heat from therebetween.

The thermopile detector 10 is mounted inside an enlarged rearward portion of the sleeve 17 so that the active face 19 thereof having a filter receives infrared radiation transmitted down the interior of the waveguide 16. A molded plastic plug 20 holds the thermopile 10 in position inside the sleeve 17. The leads 22 of the thermopile extend through holes in the plug 20.

A disposable sanitary cover in the form of a speculum 23 (FIG. 1A) is mounted over the tip 14a of the probe prior to inserting the probe into a patient's external ear canal. This speculum includes a transverse infrared transparent membrane and a means for removably mounting the membrane over the probe so that it extends across the tip 14a. The mounting means comprises a tubular body 23b that deforms and snaps over retaining shoulder 14d of the probe. See U.S. Pat. No. 4,662,360 of O'Hara et al. granted May 5, 1987.

When placed in contact with the ear the plastic probe and waveguide combination will not change temperature rapidly. The tubular metal waveguide 16 will not be at the same temperature as the infrared detector reference junctions and will introduce an error if the reflectivity of the waveguide is less than 100%. A reflectivity of 98% is a practical limit given production constraints. Optical analysis has shown that on average, a beam of radiation bounces eight times inside the probe and waveguide combination prior to reaching the thermopile. The apparent reflectivity is thus $0.98^8$ or 85%. The waveguide 16 is therefore 15% emissive.

A benefit of utilizing a non-thermally conductive outer probe 14 and an inner waveguide separated with an air gap is the minimization of "drawdown." This is the sinking of heat from the ear due to contact with a thermally conductive object which is at a lower temperature than the ear. It may be possible to use a plastic probe with a plated-on metal layer as a waveguide. The benefit of a plastic waveguide is that it does not change temperature as quickly when placed in the ear. However, a disadvantage of a plastic waveguide is that it is not as easy to measure its overall temperature with a sensor positioned at one location thereon as disclosed hereafter.

An external filter 24 (FIG. 1) is attached to the forward end 14a of the probe 14. The filter 24 covers the forward end of the waveguide 16 to keep dust and contaminants from entering and changing the reflectivity thereof. The filter 24 should be as transmissive as possible in the infrared region with a bandpass equal to or wider than that of the filter on the thermopile. For example, if the thermopile filter has a bandpass of eight to twelve microns in wavelength, then the external filter 24 could have an eight to twelve micron or seven to thirteen micron wavelength bandpass. A transmissivity of at least 94% is desirable in the bandpass. Lower transmissivities will increase infrared emissions from the filter 24 which will introduce an error due to heat from the ear heating the filter when in direct contact. One suitable infrared filter 24 is made of Germanium and has a multi-layer anti-reflective coating on both sides. Such a filter is commercially available from Optical Coating Laboratories, Inc.

A third sensor 26 (FIG. 1B) is thermally coupled to the waveguide 16. This sensor generates an analog output signal (voltage) on lines 26a representative of the temperature of the waveguide 16. Preferably sensor 26 is a thermistor which is attached with thermal EPOXY. The lines 26a from the thermistor extend through the air gap G and a slot 17a in the mounting sleeve 17. The third sensor is sometimes referred to herein as the waveguide temperature sensor.

An ejector sleeve 28 (FIG. 1A) surrounds probe portions 14b and 14c and may be slid forwardly by spring S via manual actuation of an ejector button (not illustrated) mounted on case 15 in order to engage the rear end of the speculum 23 and push it off of the probe for disposal.

Figure 2:
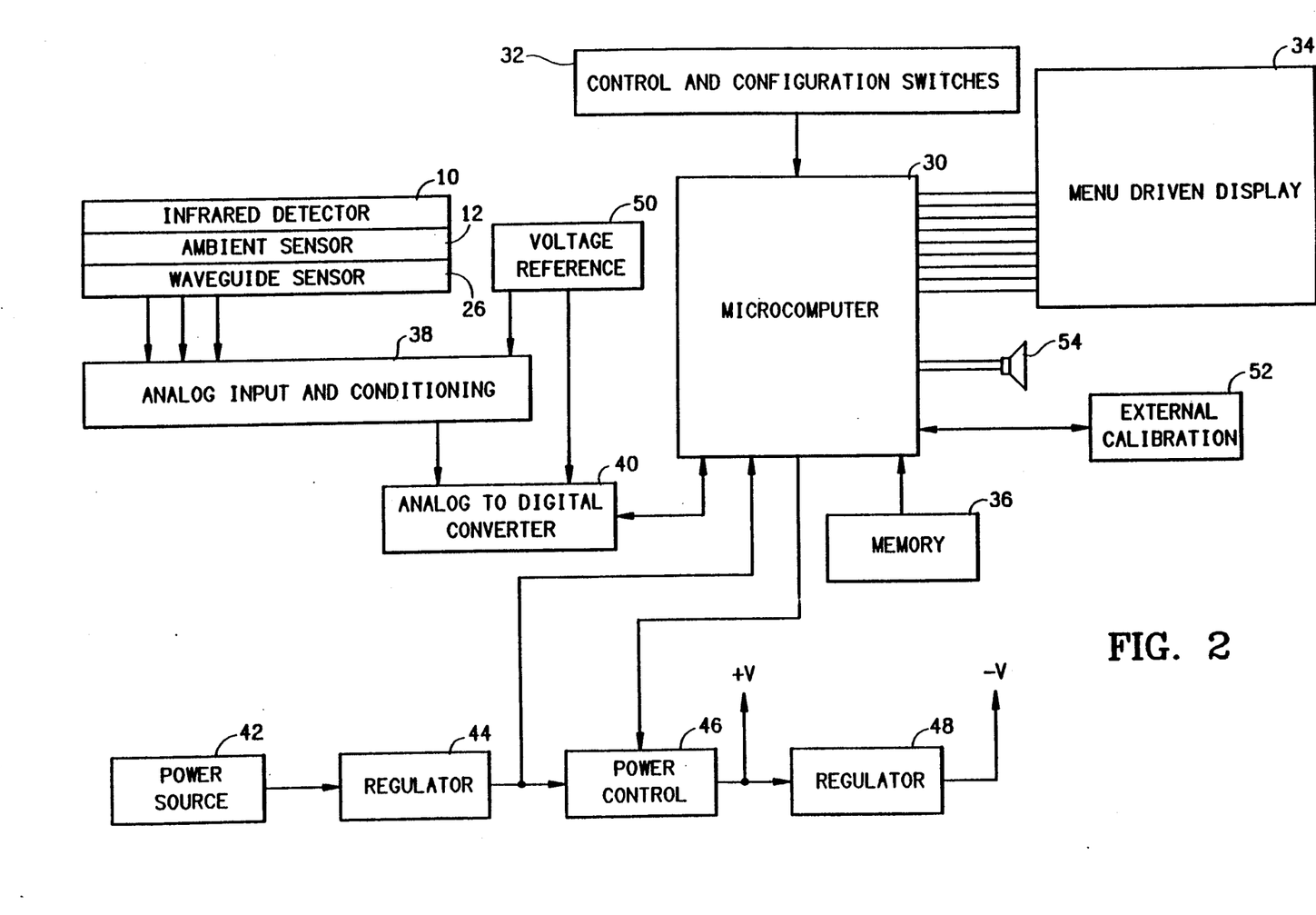
FIG. 2 is a functional block diagram of the electronic circuitry of the preferred embodiment.

FIG. 2 is a functional block diagram of an electronic circuit that may be used in the preferred embodiment of our invention. It includes a microcomputer 30 which receives operator commands via control and configuration switches 32 and which operates a menu driven display 34. By way of example, the microcomputer and menu driven display 34 may be provided in the form of a single HITACHI Model HD4074808H chip and a liquid crystal display. The control and configuration switches may include a plurality of dual-in-line (DIP) switches which allow an operator to select a tympanic mode, a skin surface mode, degrees F., degrees Centigrade, oral measurement or rectal equivalent measurement. Similar function selection switches are utilized in the aforementioned FirstTemp tympanic thermometer mentioned above.

An operational program executed by the microcomputer 30 may be stored in the internal read only memory (ROM) or EPROM of the microcomputer 30. Another memory 36 is connected to the microcomputer for permitting storage of a polynomial algorithm used to determine a measured body temperature. By way of example, this memory may comprise a 1K bit electrically erasable programmable read only memory (EEPROM) commercially available from ROHM. Signals from the sensors 10, 12 and 26 are fed through analog input and conditioning circuitry 38. This latter circuitry may be provided by a Model No. 74HC4051 input multiplexer chip commercially available from RCA Signals from this circuitry are fed through analog-to-digital converter 40 to the microcomputer This {analog-to-digital converter} (ADC) may be provided by a Model No. TSC500 integrated circuit available from TELEDYNE. A power source 42 preferably takes the form of a nine volt alkaline battery. DC power from this source is fed to a regulator circuit 44 This regulator circuit provides a positive five volt signal to a power control device 46 which in turn is connected to a second regulator circuit 48 for providing a negative five volt signal. The regulator circuit 44 may be provided in the form of a model SCI7710YBA integrated circuit commercially available from SMOS. The regulator circuit 48 may be provided by a Model No. TSC7660 integrated circuit commercial available from TELEDYNE. Power control device 46 is capable of shutting down all but standby power when the thermometer goes into a watch mode. The power control may take the form of a simple field effect transistor (FET).

Both the analog input conditioning circuitry 38 and the analog to digital convertor 40 are connected to a voltage reference circuit 50 (FIG. 2). This voltage reference circuit may be provided by a model MC1403D integrated circuit commercially available from MOTOROLA. An external calibration apparatus 52 may be connected to microcomputer 30 for calibrating the system. As explained hereafter in conjunction with FIG. 7. This apparatus includes an external computer that communicates with the microcomputer 30 through its internal series input/output port. An audio speaker 54 is driven by the microcomputer for providing audible beeps to prompt operator action or warn of other conditions, such as failure to install a new sanitary disposable cover or speculum over the probe or low battery power condition.

The preferred embodiment of our thermometer operates in a significant different way than prior art infrared sensitive thermometers that have attempted to use a rigid set of equations describing the interactions of the components in terms of the physical laws of irradiance such as Planck's law, and the Stephan-Boltzmann equation. Some of these prior art thermometers have corrected the calculated body temperature by subtracting out the component due to the difference in temperature between the waveguide and the thermopile.

The approach used by our invention comes from the field of complex systems modeling rather than the physics of irradiance. We discovered after extensive experimentation that the relationships between all the inputs and target temperature are too complex to determine. Instead, during the calibration of the preferred embodiment of our thermometer, a matrix is built representing a sufficient number of instances of target temperature and ambient temperature. A multi-dimensional surface is thus mapped relating inputs to a measured output without regard to the physics of the interrelationships between the inputs. For example, a given target temperature of ninety-eight degrees Fahrenheit (F.) may correspond to a thermopile voltage of 31 micro-volts, an ambient temperature sensor resistance of 1,234 ohms and an optic waveguide temperature sensor resistance of 4,321 ohms. The output of ninety-eight degrees is the result of the calibration mapping of the three inputs to the temperature of a black-body target. The preferred embodiment of our thermometer does not determine what the ambient temperature is, what the waveguide temperature is or what the responsivity of the thermopile is.

During calibration the preferred embodiment of our thermometer is:
1) The thermometer is exposed to a sequence of black-body targets covering the span of its intended target range.
2) The ambient temperature is cycled during the aforementioned sequence of exposures through various settings covering the span of its intended operating range.
3) For each target temperature, the signals from the thermopile, the ambient temperature sensor, the optic waveguide temperature sensor and a null amplified value are collected.
4) When completed the set of inputs are mapped to their output according to a multiple linear regression technique. The various inputs in addition to their squares and cubes are the independent variables with the target being the dependent variable.
5) The result of the curve fit is a set of thirteen coefficients which are used at measurement time to determine target temperature.

At measurement time the preferred embodiment of our thermometer:
1) Reads four digitally converted input voltages-
   A) Thermopile $\{V_t\}$;
   B) Ambient Temperature sensor voltage $\{V_a\}$;
   C) Waveguide temperature sensor voltage $\{V_w\}$; and
   D) Null amplified voltage $\{V_n\}$.
2) The Target temperature $T_t$ is calculated using the following algorithm having thirteen coefficients $\{a_1 - a_{13}\}$ which are determined during calibration:

$$T_t = a_1 + a_2\{V_t - V_n\} + a_3\{V_t - V_n\}^2 + a_4\{V_t - V_n\}^3 +$$
$$a_5 V_a + a_6 V_a^2 + a_7 V_a^3 + a_8 V_w + a_9 V_w^2 + a_{10} V_w^3 + a_{11}\{V_t -$$
$$V_n - V_a\} + a_{12}\{V_t - V_n - V_a\}^2 + a_{13}\{V_t - V_n - V_a\}^3$$

The squared and cubed terms of the algorithm set forth above cause some of the terms of the equation to become quite large and others to become quite small with respect to each other. The preferred embodiment of our thermometer utilizes a small microprocessor having a limited program memory, a limited scratchpad memory, a limited memory for storage of constants, and a limited processing speed. In order to optimize the resources of this relatively small microprocessor, the large differences in relative magnitudes of the terms in the algorithm are best accommodated utilizing floating point numbers. Such numbers have two parts, namely an exponential part and a mantissa. The mantissa requires the most bits. In order to enable a relatively small microprocessor to calculate body temperature using the above algorithm in the most efficient manner, the size of the mantissa of the floating point numbers must be limited. Limiting the size of the mantissa saves program memory in coding the arithmetic operations, saves scratchpad memory and constant memory size because the numbers are smaller, and saves processing time since there are fewer bits to process. However, when the number of the bits in the mantissa is reduced some precision is lost when a large number is added to a small number due to truncation error. In order to keep this error within acceptable bounds, the difference in magnitude of the numbers added together must be kept within a limited range.

While not set forth in the previously stated thirteen coefficient algorithm, we have found that by adding a constant, herein referred to as OFFSET, to one or more of the terms in the regression, the coefficients of the algorithm can be altered without affecting the accuracy of the result while simultaneously decreasing the truncation error. In the selection of this OFFSET constant, a number of trial regressions are performed. It is then necessary to determine which set of coefficients will have the least truncation error. There are two possible solutions. First of all, a number of trial computations can be performed with the selected microprocessor or with a software or hardware emulation of the floating point package of the selected microprocessor. An alternative approach is to determine which set of coefficients will yield the best results by examining the coefficients themselves. This latter approach is the most desirable because it requires the least amount of time and expense to implement. In order to effect this second approach, a measure or statistic of truncation is required. We have developed such a statistic which can be obtained from the ratio of coefficients. The ratio we have developed is:

$$T_{stat} = a_1 + a_2/a_3 + a_5/a_6 + a_8/a_9 + a_{11}/a_{12}.$$

The regression with the lowest $T_{stat}$ is then chosen as the one most likely to produce the least truncation error.

The determination of the extent of thermal equilibrium between the thermopile and the wave guide is not possible with the preferred embodiment of our thermometer. This is because neither the sensor attached to the thermopile nor the sensor attached to the waveguide are calibrated in relation to each other nor to any temperature scale. Therefore the preferred embodiment of our thermometer cannot determine to what extent any sensors are in equilibrium with each other either at calibration time or at temperature measurement time. Such a determination is unnecessary with our new way of determining body temperature from infrared emissions.

There are no means in the preferred embodiment of our thermometer for correcting an electrical signal from the infrared sensor. The concept of correction is not applicable to the calibration or measurement method of our invention. All sensor input is mapped to yield a target temperature according to the thirteen-dimensional surface map that was determined at calibration time. No sensor input is used to correct any other sensor input(s). No intermediate (uncorrected) temperature is determined.

During the early design phase of our thermometer, a correction technique employing the prior art approach of correcting for the temperature difference between the thermopile and the waveguide was tested. However, we abandoned this prior art approach due to the inability to correct over a sufficient range of conditions and an unacceptable accumulation of tolerances in the individual components. It was this failure that prompted a radically different approach resulting in the subject invention.

Figure 3:
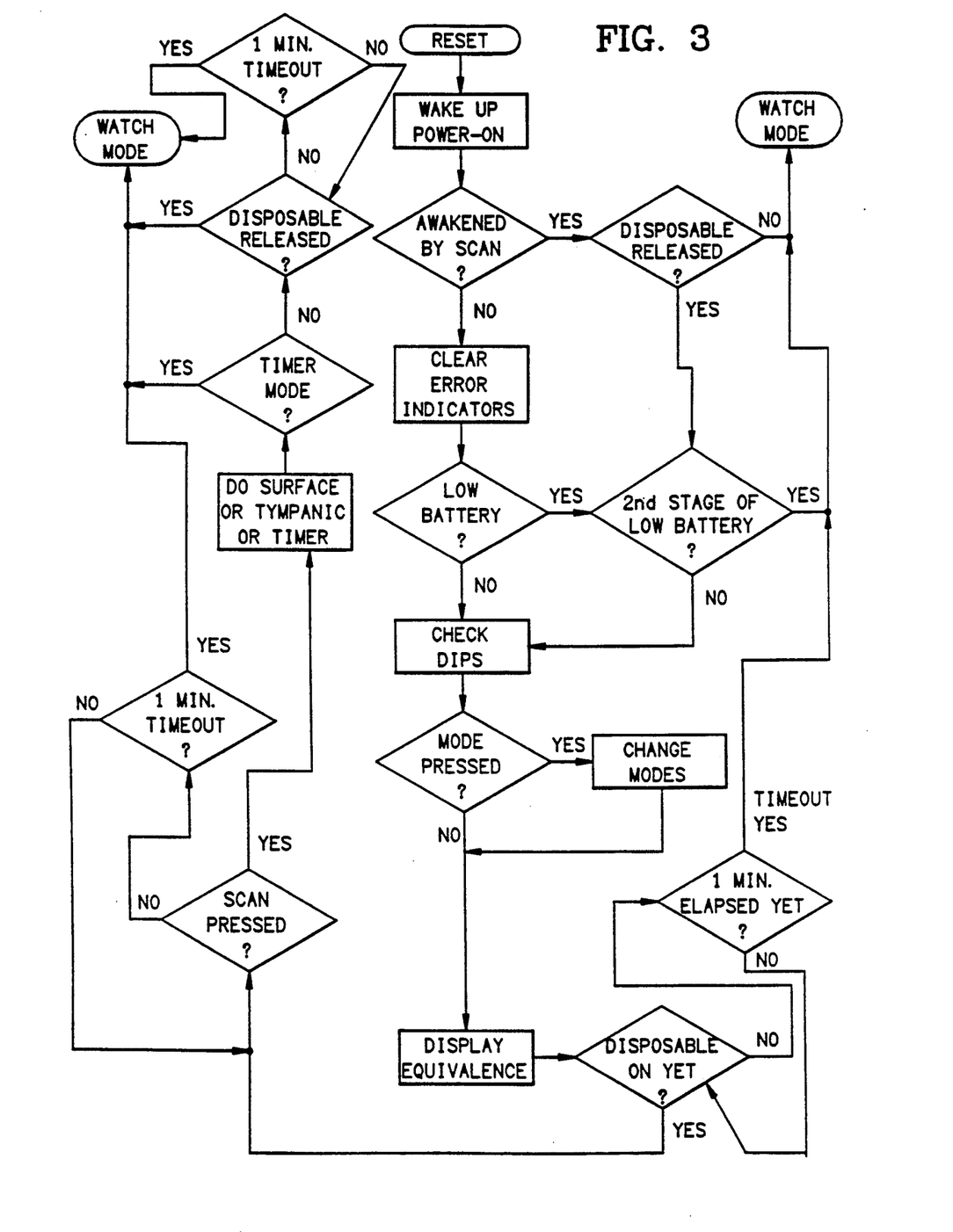
FIG. 3 is a flow diagram of the overall operation of the preferred embodiment.

FIG. 3 is an overall flow diagram of the operation of the first embodiment of the tympanic thermometer of the present invention.

Figure 4:
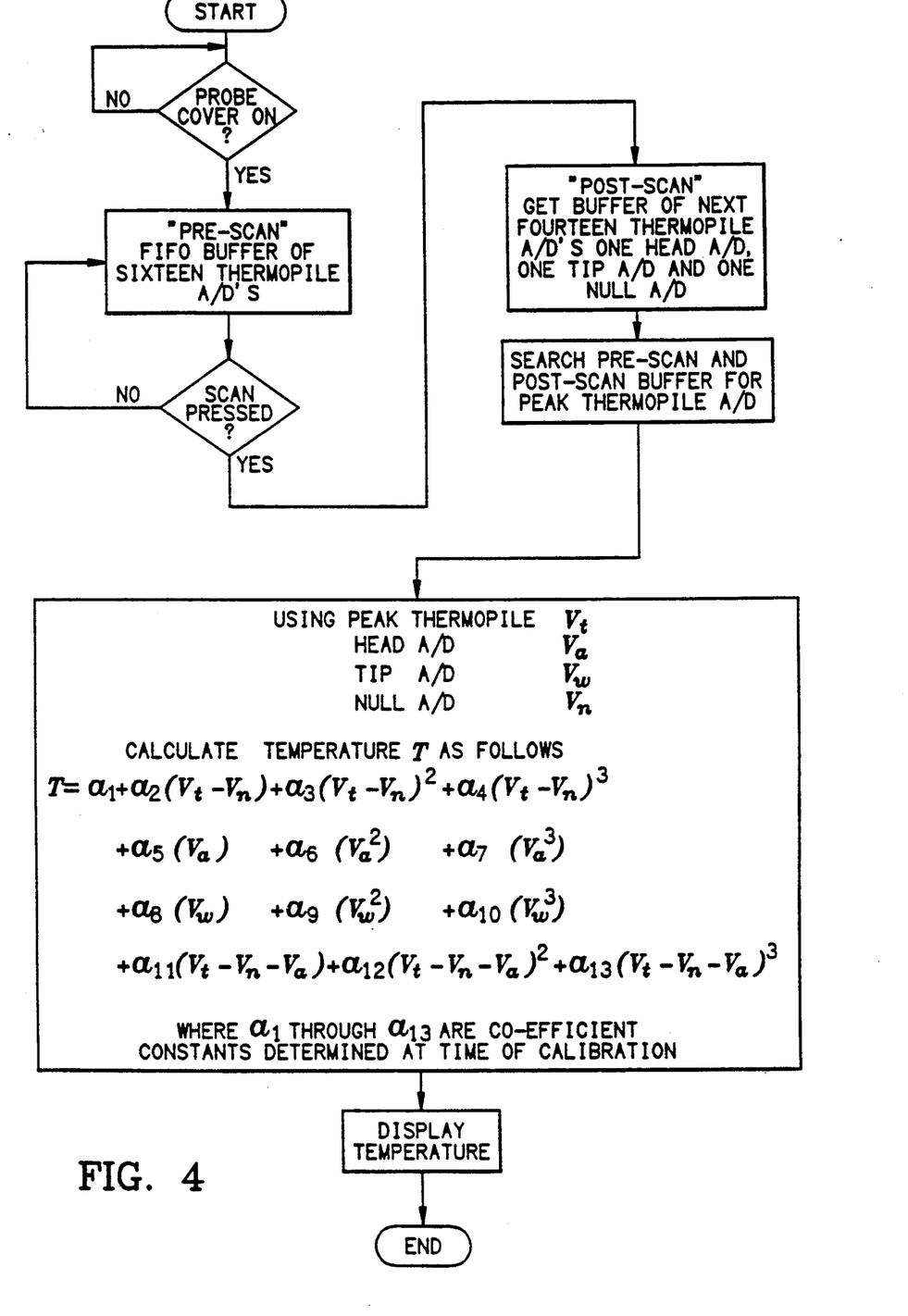
FIG. 4 is a flow diagram of the steps executed by the preferred embodiment to determine the body temperature.
Figure 5:
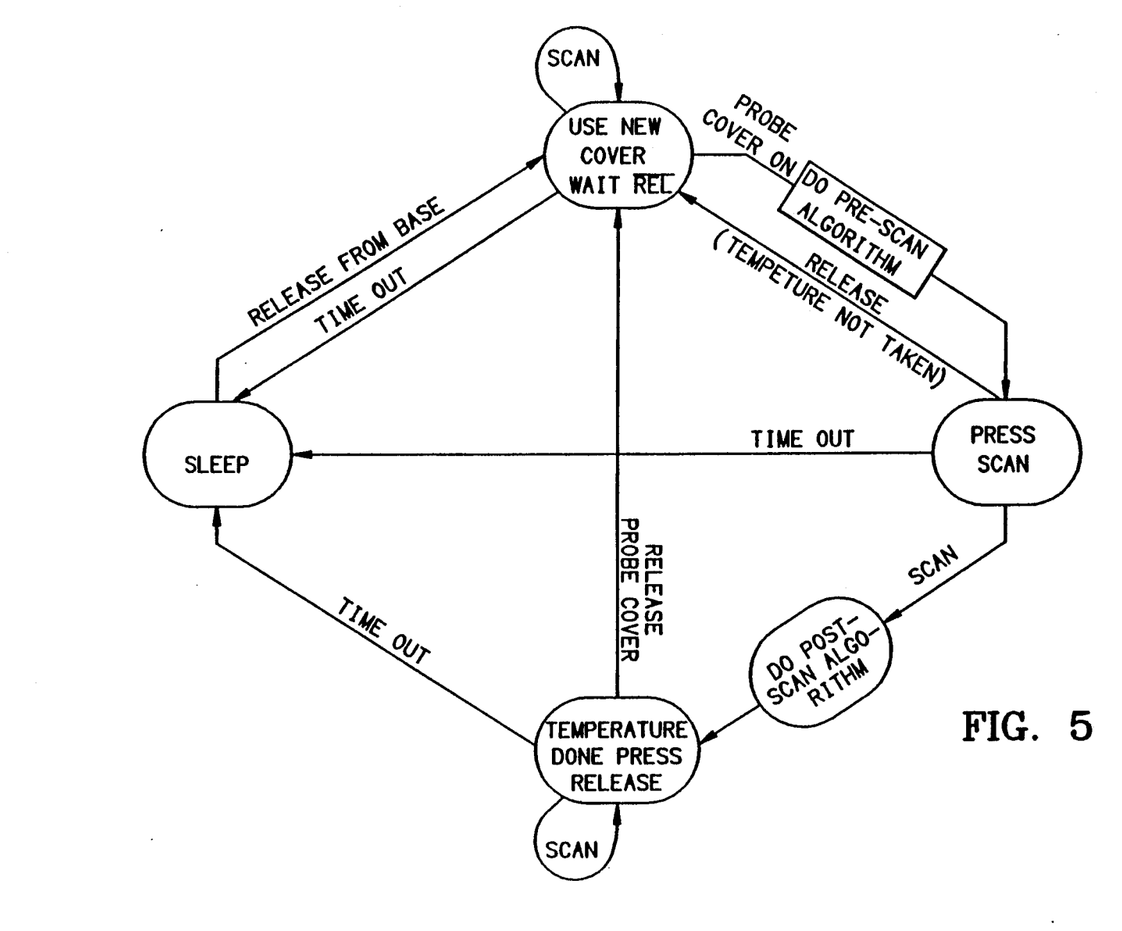
FIG. 5 is a state diagram illustrating the menus displayed during the operation of the preferred embodiment.

FIGS. 4 is a flow diagram of the steps executed by the preferred embodiment to determine the body temperature.

Figure 6:
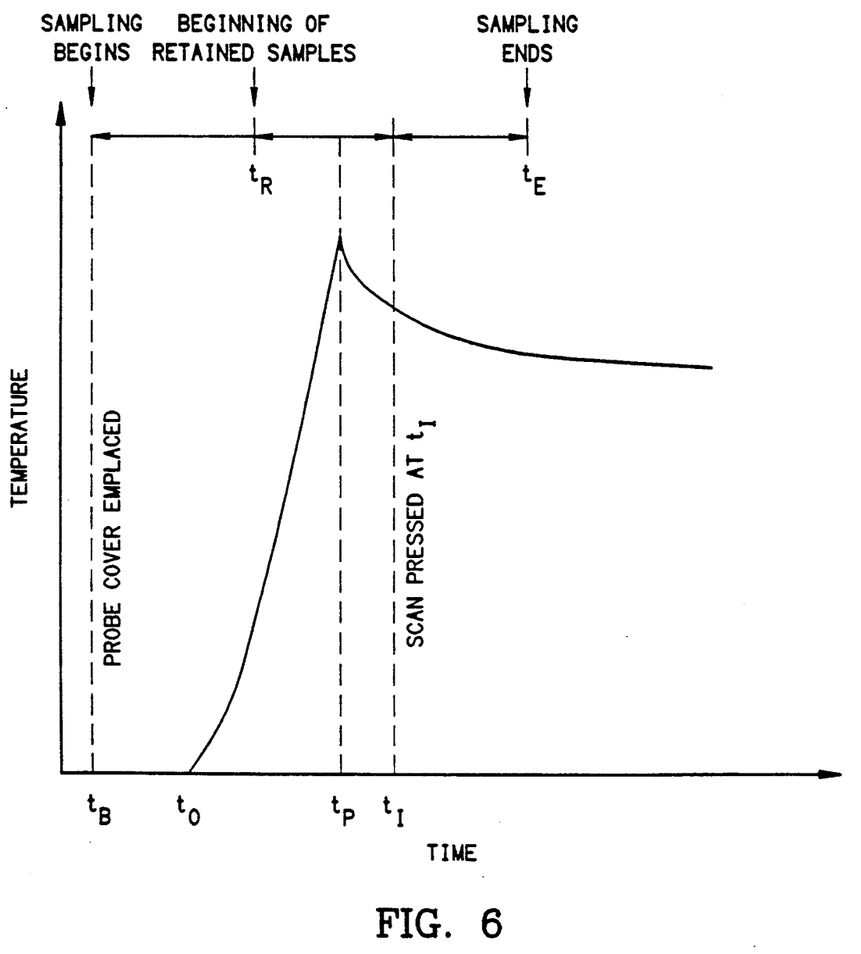
FIG. 6 is a temperature versus time graph illustrating the look ahead feature of the preferred embodiment.

The preferred embodiment of our thermometer also preferably incorporates a "look ahead" feature. Between operators, the duration between insertion of the probe 14 into the external ear canal and the depression of the SCAN button may vary. Because of the draw down effect, this variance between operators can result in different temperatures being measured. Referring to the graph of FIG. 6, it can be understood that draw down prevents a "flat" waveform. If the operator presses the SCAN button after draw down has reduced the sample temperature, the peak temperature will be lost. As indicated above, the solution is to start sampling the output of the thermopile at $t_B$ when the probe cover or speculum is first emplaced over the probe tip 14a. The samples can be saved in a one-second circular list. When the SCAN button is pressed, sampling of the output of the thermopile continues for one more second. The microprocessor 30 then selects the peak value from the two seconds of samples. The first one second interval prior to depression of the SCAN button is illustrated as $t_R$ to $t_I$. The second one second interval is $t_I$ to $t_E$.

Referring to FIG. 4, mechanisms hereafter described sense the emplacement of a speculum or probe cover onto the thermometer. A signal is sent to the microcomputer 30 indicating that a probe cover is on. The microcomputer then begins sampling the output of the thermopile at the rate of sixteen samples per second. The digitally converted values of the analog output signals of the thermopile are stored in a circular list. Once the scan button of the thermometer is pressed, the microcomputer samples the output of the thermopile fourteen times and then samples the output of the ambient sensor and waveguide sensor once apiece, and stores the digitally converted values of these output signals. In addition, the microcomputer samples the null samplified voltage ($V_n$) and stores the digitially converted value thereof. The microcomputer then searches the pre-scan circular list and the post-scan list for the peak thermopile output signal. Using the digital value of this peak thermopile output signal, along with the digital values of the second and third sensor outputs and the null amplified voltage, a body temperature is calculated utilizing the previously described algorithm which was created by multiple linear regression techniques performed on the calibration mapping.

A reed switch 56 (FIG. 1A) on a printed circuit board 58 is actuated by a magnet 59 mounted to reciprocating ejector sleeve 28. The printed circuit board is mounted to the rear 35 end of probe portion 14b. When the speculum 23 is placed over probe tip 14a its rear end engages the forward end of sleeve 28 and pushes the sleeve to its retracted position, compressing the spring S. This moves magnet 59 away from reed switch 56, sending a signal to the circuit of FIG. 2 which tells the microprocessor 30 that a speculum has been installed. This in turn causes the microprocessor to initiate sample measurements at the rate of sixteen per second.

Figure 7:
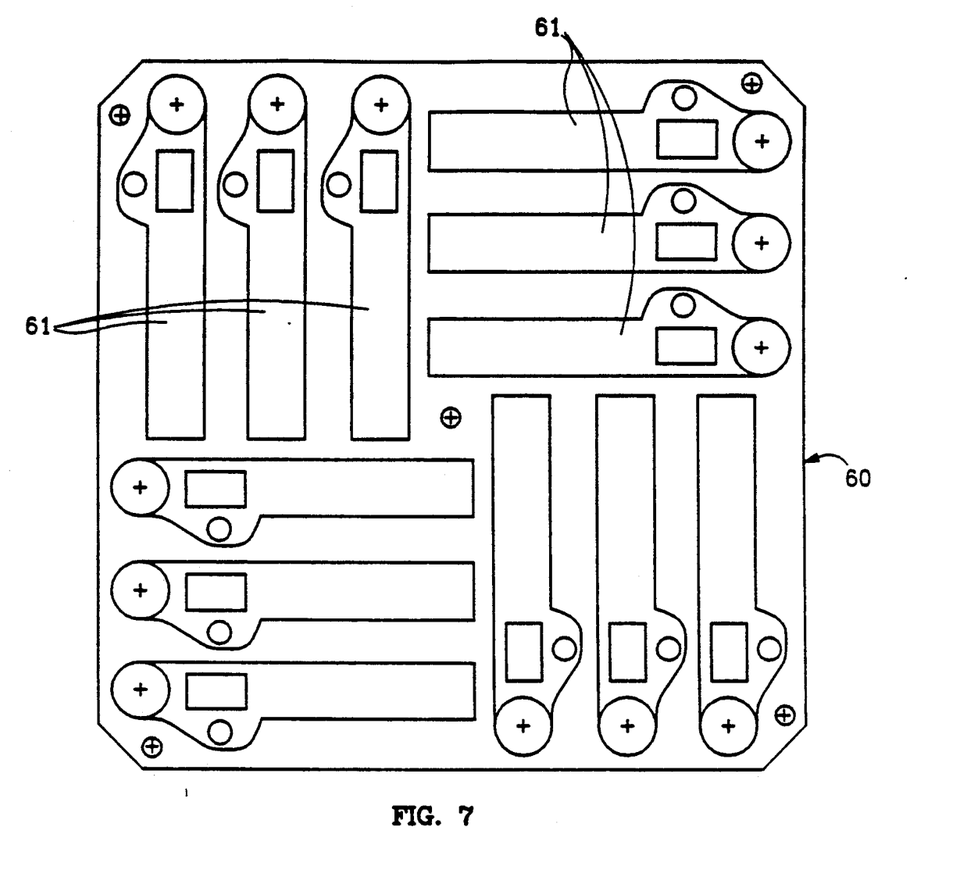
FIG. 7 is an enlarged plan view of a pallet which supports a plurality of tympanic thermometers.
Figure 8:
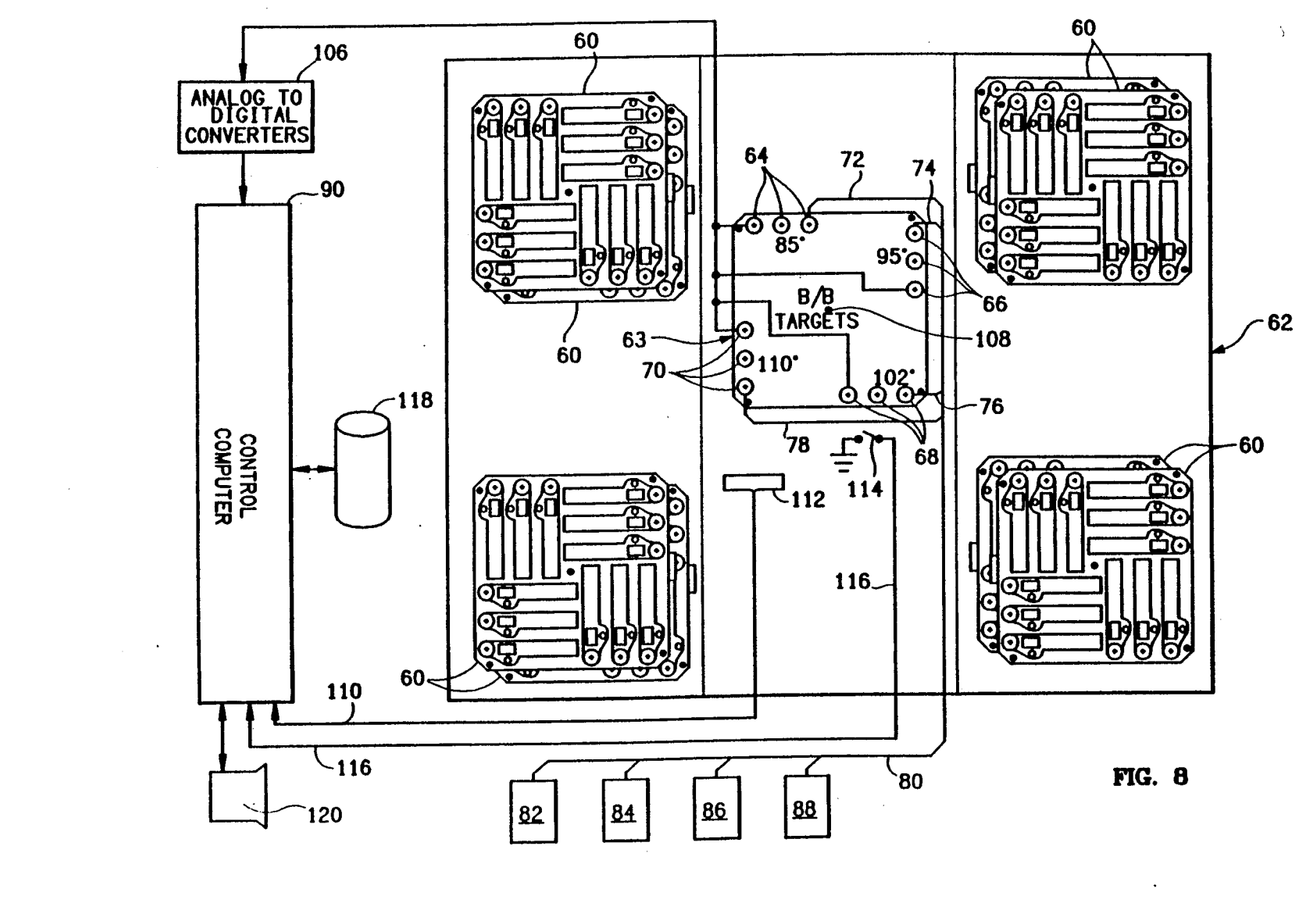
FIG. 8 is a diagrammatic illustration of an apparatus used to calibrate a plurality of tympanic thermometers embodying the preferred embodiment of the present invention.

During mass production of thermometers of the foregoing type they must be calibrated upon completion of their assembly. FIG. 7 is an enlarged plan view of a pallet 60 which supports a plurality of tympanic thermometers 61, in groups of three. The probe of each thermometer projects downwardly through a corresponding hole (not visible) in the pallet. FIG. 8 is a diagrammatic illustration of an apparatus used to calibrate a plurality of tympanic thermometers embodying the preferred embodiment of the present invention. A plurality of pallets loaded with thermometers are placed in an environmental chamber 62 set at a first predetermined ambient temperature. One suitable environmental test chamber is the CYBORTRONICS Series 3000 commercially available from Cybortronics, Inc. of Irvine, Calif. A test bed 63 is located in the center of the environmental chamber. The test bed supports four sets 64, 66, 68 and 70 of three black body targets which are maintained at precise temperatures of eighty-five, ninety-five, one hundred and two, and one hundred and ten degrees F. The black body targets have water flowing therethrough to precisely maintain their temperatures, as described hereafter in greater detail. Water flows and returns to each of the four sets of targets through separate pipes 72, 74, 76 and 78. These separate water pipes are shown diagrammatically as a single line 80 feeding to corresponding temperature controlled pump units 82, 84, 86 and 88. One suitable pump unit is the Tempette TE-8D commercially available from Techne Ltd. of Cambridge, England.

Figure 9:
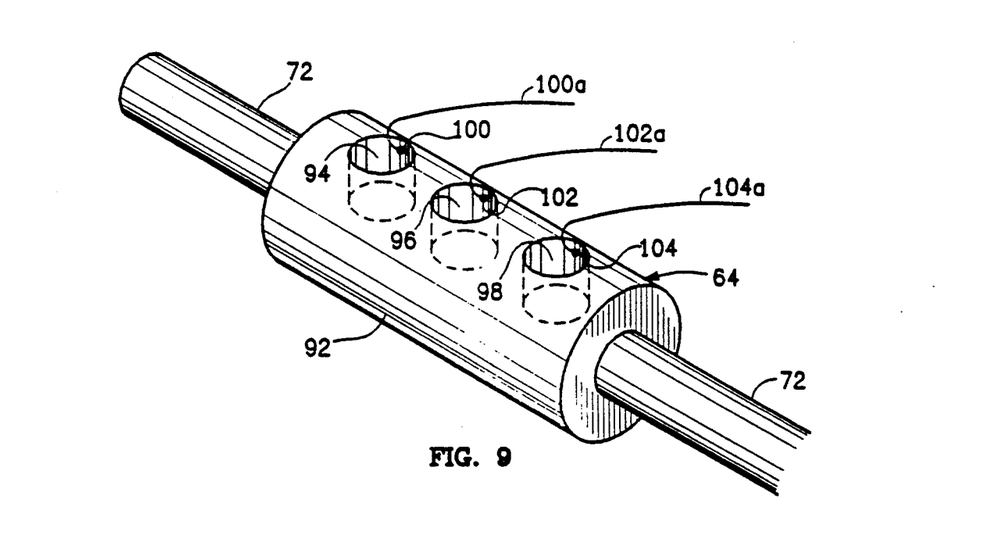
FIG. 9 is an enlarged elevation view of some of the water heated targets of the calibration apparatus of FIG. 8.

An external computer 90 (FIG. 8), which is preferably in IBM-compatible personal computer incorporating an INTEL 486 microprocessor, receives signals from the test bed 62 regarding the temperature of the sets 64, 66, 68 and 70 of black body targets. Referring to FIG. 9, each set of black body targets, such as 64, includes a cylindrical hollow vessel 92 connected in line with the corresponding separate water pipe, such as 72. Three cylindrical receptacles 94, 96 and 98 open outwardly through corresponding holes in the sidewall of the vessel 92 and have sealed bottoms illustrated by the dashed line circles in FIG. 9. The probe tips of corresponding ones of the thermometers being calibrated point downwardly into these cylindrical receptacles, which are preferably made of black anodized Aluminum. Thus the receptacles function as the black body targets. Thermistors 100, 102 and 104 are secured via thermal epoxy to the walls of the receptacles 94, 96 and 98. The leads 100a, 102a and 104a of these thermistors are connected to corresponding analog-to-digital converters which are collectively illustrated at 106 in FIG. 8.

A plurality of pallets 56, each loaded with twelve thermometers 61 are stored inside the environmental chamber 62 so that they can all come to equilibrium at a selected initial ambient temperature, such as sixty degrees F., within the environmental chamber. A pallet can then be manually loaded onto a support pedestal 108 in the center of the test bed 62. This is done by an operator reaching into the chamber through gloved portals in a sidewall thereof. The pallet is configured so that each of the thermometers has its probe tip pointing to the inside of a corresponding receptacle of its associated set of black body targets. The thermometers are each connected to the control computer 90 through a corresponding one of twelve serial data busses represented by the line 110 in FIG. 8 and through a wiring harness and connector set illustrated diagrammatically at 112. The pedestal 108 can be rotated in ninety degree increments by a motor (not illustrated) to sequentially place point the probe tip of each thermometer over black body targets which are maintained at eighty-five, ninety-five, one hundred and two and one hundred and ten degrees F. The computer keeps track of the rotational orientation of the pallet 60, and thus which target each thermometer is pointed at, via closure of switch 114 sensed on line 116. This occurs upon each ninety degree rotation of the pallet 60.

Output data from the microcomputer 30 of each thermometer which is representative of the signals from the sensors 10, 12 and 26 is fed to the external computer 90 via lines 110 and is logged on memory 118 which may take the form of a Winchester disk drive. The calibration is controlled by an operator via keyboard input and is monitored on a CRT display 120. This process is repeated at ambient temperatures of seventy, eighty, ninety and one hundred degrees F. inside the environmental chamber.

Preferably calibration mapping is also performed in a manner that simulates a moving ambient temperature. For example the chamber could be set at sixty degrees F. A pallet with twelve thermometers could be allowed to stabilize at a room temperature of seventy degrees F. Then the pallet could be placed on the test bed within the chamber and the outputs of the sensors logged as the pallet is rotated over the black body target during the time that the thermometers are cooling to the sixty degree F. temperature.

Once all of the data has been collected and logged onto the memory 118 an equation which approximates the calibration mapping of each thermometer is calculated using the regression techniques discussed above. The coefficients of each term of the equation are stored in the memory 36 of the corresponding thermometer.

We have found that is possible to improve the mapping by adding information about the time history of the sensors to the regression inputs. This is especially true for the thermopile. Thermopile output is not only proportional to the environment that it sees at the present time but also to the environments in its immediate past. The regression can be improved by adding several additional terms which contain information about the sensor's time history: TPILAD(t-1), TPILAD(t-2), TPILAD(t-3), TPILAD(t-4)..., etc., where TPILAD(t-1) represents the thermopile sensor reading one time period back, TPILAD(t-2) represents the thermopile sensor reading two back, TPILAD(t-3) represents the thermopile sensor reading three time periods ago, etc. The time periods can be seconds or multiples or fractions thereof, depending upon the time constant of the sensor. The squared and cubed forms of the above parameters can be included in order to further improve the mapping in situations where a straight line map is insufficient.

There are other ways in which to describe the time history, which would have much the same result. For example instead of using the sensor output at times t-1, t-2, etc. one or more low pass filters could be used to integrate the sensor output. The first and possibly second derivative of the sensor output could be utilized to determine the rate of change of the sensor. These parameters, alone or in combination with the sensor outputs at time t-1, t-2, etc., could be used to improve the mapping.

While preferred embodiments of the infrared tympanic thermometer and body temperature measuring method of the present invention have been described it should be understood that modifications and adaptations thereof will occur to persons skilled in the art. For example, thermistors 12 and 26 could be replaced with other fast time constant temperature sensors including diodes, RTDs, thermocouples or integrated circuits. The coefficients of the equation approximating the mapping can be determined by numerical approximation, multiple regression, or other "curve fitting" techniques. A look-up table of values could be used instead of calculating the body temperature with a stored equation. The third sensor on the waveguide could be eliminated, although some decrease in accuracy might result. This inaccuracy could be minimized by actively heating the optical head assembly to minimize the draw down that otherwise would occur upon insertion of the probe tip into the external ear canal. The operational program could be written to introduce an offset correction before displaying the determined body temperature to compensate for variations in the room temperature from a nominal room temperature of, for example, seventy degrees F., as detected by the ambient sensor 12. The magnitude of the offset correction could be a function of the detected ambient temperature, rather than a fixed offset. Therefore, the protection afforded the present invention should only be limited in accordance with the scope of the following claims.

We claim:

1. A body temperature thermometer, comprising:
   first sensor means for generating a first output signal representative of an amount of infrared radiation impinging thereon from a biological surface tissue of a patient;
   second sensor means for generating a second output signal representative of a temperature of the first sensor means;
   processor means connected to the sensor means for processing the output signals to determine a body temperature of the patient utilizing a calibration mapping of a plurality of target temperatures to corresponding output signals; and
   means connected to the processing means for providing a user with an indication of the determined body temperature.

2. A body temperature thermometer according to claim 1 and further comprising means for receiving infrared radiation emitted by the biological surface tissue and directing the radiation to the first sensor means.

3. A body temperature thermometer according to claim 2 and further comprising third sensor means connected to the processor means for generating a third output signal representative of a temperature of the infrared radiation receiving and directing means.

4. A body temperature thermometer according to claim 3 wherein the receiving and directing means includes an elongate waveguide and the third sensor means is thermally coupled to the waveguide.

5. A body temperature thermometer according to claim 2 wherein the infrared radiation receiving and directing means further includes a hollow plastic probe which surrounds the waveguide.

6. A body temperature thermometer according to claim 1 wherein the means for providing an indication of the determined body temperature includes a display.

7. A body temperature thermometer according to claim 1 wherein the processor means includes a plurality of stored coefficients of an equation that approximates the calibration mapping.

8. A body temperature thermometer according to claim 7 wherein the equation is obtained by performing multiple linear regression on the calibration mapping.

9. A body temperature thermometer according to claim 1 wherein the processor means determines a sequence of body temperatures over a predetermined time interval and selects a peak body temperature therefrom which is provided to the indication means.

10. A body temperature thermometer according to claim 1 wherein the first sensor means includes a thermopile.

11. A body temperature thermometer according to claim 1 wherein the second sensor means is thermally coupled to the first sensor.

12. A body temperature thermometer according to claim 1 wherein the calibration mapping of the plurality of target temperatures to corresponding output signals is taken over a predetermined range of ambient temperatures.

13. A tympanic thermometer, comprising:
    first sensor means for generating a first output signal representative of an amount of infrared radiation impinging thereon from an external ear canal of a patient;
    second sensor means for generating a second output signal representative of a temperature of the first sensor;
    probe means for receiving infrared radiation emitted by the biological surface tissue and directing the radiation to the first sensor means;
    third sensor means for generating a third output signal representative of a temperature of the infrared radiation receiving and directing means;
    processor means connected to the sensor means for processing the output signals to determine a body temperature of the patient utilizing a calibration mapping of a plurality of target temperatures to corresponding output signals over a predetermined range of ambient temperatures; and
    means connected to the processing means for providing a user with an indication of the determined body temperature.

14. A body temperature thermometer according to claim 13 wherein the means for providing an indication of the determined body temperature includes a display.

15. A body temperature thermometer according to claim 13 wherein the processor means includes a plurality of stored coefficients of an equation that approximates the calibration mapping.

16. A body temperature thermometer according to claim 13 wherein the processor means determines a sequence of body temperatures over a predetermined time interval and selects a peak body temperature therefrom which is provided to the indication means.

17. A body temperature thermometer according to claim 13 wherein the probe means includes an elongate waveguide.

18. A body temperature thermometer according to claim 13 wherein the third sensor means is thermally coupled to the probe means.

19. A body temperature thermometer according to claim 13 wherein the first sensor means includes a thermopile.

20. A method of determining the body temperature of a patient, comprising the steps of:
    providing a probe head assembly having a probe tip insertable in an external ear canal of a patient and an infrared sensor;
    sampling the output of the infrared sensor prior to insertion of the probe tip into the external ear canal and storing a first set of values representative thereof;
    inserting the probe tip into the external ear canal so that infrared emissions in the external ear canal impinge on the infrared sensor;
    sampling the output of the infrared sensor and storing a second set of values representative thereof; and
    determining a body temperature of the patient based upon a peak value of the first and second set of values.

21. A method of determining the body temperature of a patient, comprising the steps of:
    providing a probe head assembly having a first sensor for receiving infrared radiation emitted in the ear canal of a patient and generating a first output signal representative of the amount of infrared radiation impinging thereon and a second sensor for generating a second output signal representative of the temperature of the first sensor;
    successively pointing the probe head assembly at a plurality of targets each maintained at a corresponding reference temperature;

storing a calibration mapping of the magnitudes of the first and second output signals for each of the targets; and pointing the probe head assembly at the external ear canal and determining the body temperature of the patient utilizing the outputs signals from the sensors and the calibration mapping.

22. A method according to claim 21 and further comprising the steps of generating an equation which approximates the calibration mapping and determining the body temperature by inputting the output signals of the sensors into the equation.

23. A method according to claim 21 wherein the probe head assembly includes means for receiving and directing infrared radiation from the external ear canal to the first sensor and a third sensor for generating third output signals representative of the temperature of the receiving and directing means, and the calibration mapping includes the magnitudes of the third output signal for each of the targets.

24. A method according to claim 21 wherein the probe head assembly is sequentially maintained at a plurality of ambient temperatures and at each ambient temperature the probe head assembly is successively pointed at each of the plurality of targets, and further wherein the calibration mapping includes the magnitudes of the first and second output signals for each of the targets at each of the ambient temperatures.

25. A method according to claim 21 wherein the probe head assembly is allowed to stabilize at a first ambient temperature before being subjected to a second ambient temperature and the calibration mapping is generated during a time interval that the probe head assembly is cooling or heating to the second ambient temperature.

26. A tympanic thermometer, comprising:

a non-isothermal probe head assembly including an infrared sensor, a waveguide for receiving and directing infrared radiation from the external ear canal and the tympanic membrane of a patient, and means for supporting the waveguide and the first sensor so that a rear end of the waveguide is spaced adjacent to an active face of the infrared sensor, the supporting means being made solely of plastic to minimize heat flow;

an ambient sensor mounted in the probe assembly; and means connected to the infrared sensor and the ambient sensor for determining a body temperature of the patient.

* * * * *